US010256023B2

(12) United States Patent
Ozimek et al.

(10) Patent No.: US 10,256,023 B2
(45) Date of Patent: Apr. 9, 2019

(54) METHOD AND APPARATUS FOR INTERLEAVED SWITCHING OF TRACK SEGMENTS IN A MOTION CONTROL SYSTEM

(71) Applicant: Rockwell Automation Technologies, Inc., Mayfield Heights, OH (US)

(72) Inventors: Patrick E. Ozimek, Milwaukee, WI (US); Oliver C. Haya, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 296 days.

(21) Appl. No.: 15/279,518

(22) Filed: Sep. 29, 2016

(65) Prior Publication Data

US 2018/0090254 A1    Mar. 29, 2018

(51) Int. Cl.
| | |
|---|---|
| *H01F 7/20* | (2006.01) |
| *B65G 54/02* | (2006.01) |
| *H02P 27/00* | (2006.01) |
| *H02K 41/02* | (2006.01) |
| *H02P 5/00* | (2016.01) |
| *H02P 25/064* | (2016.01) |

(52) U.S. Cl.
CPC ............ *H01F 7/206* (2013.01); *B65G 54/02* (2013.01); *H02K 41/02* (2013.01); *H02P 5/00* (2013.01); *H02P 25/064* (2016.02); *H02P 27/00* (2013.01)

(58) Field of Classification Search
CPC . H01F 7/206; B65G 54/02; H02P 5/00; H02P 25/064; H02P 27/00; H02K 41/02
USPC ....................................................... 361/154
See application file for complete search history.

(56) References Cited

U.S. PATENT DOCUMENTS

| | | | |
|---|---|---|---|
| 6,191,507 B1 * | 2/2001 | Peltier .................... | B65G 54/02 310/12.02 |
| 6,844,644 B2 * | 1/2005 | Arimitsu .................. | H02P 5/74 310/114 |

(Continued)

FOREIGN PATENT DOCUMENTS

| | | |
|---|---|---|
| DE | 102012204916 A1 | 10/2013 |
| EP | 1015851 A2 | 7/2000 |

OTHER PUBLICATIONS

Extended European Search Report dated Feb. 16, 2018; Application No. 17185290.8—(8) pages.

*Primary Examiner* — Kevin J Comber
(74) *Attorney, Agent, or Firm* — Boyle Fredrickson, SC

(57) ABSTRACT

A power converter for a linear drive system having improved control of the switching devices to reduce the effects of localized heating within the power converter is disclosed. The linear drive system controls multiple movers along a track. Multiple coils are positioned adjacent to each other along the length of the track. Each coil is connected to a switching device within the power converter to energize and de-energize the coils. Pairs of adjacent switching devices are connected to coils that have at least additional coil located between the adjacent switching devices. Thus, adjacent switching modules do not conduct the same level of current and those switching modules that are required to conduct elevated levels of current are spaced apart from each other within the power converter. Consequently, the heat generated as a result of the elevated current and increased switching is similarly spread out within the power converter.

15 Claims, 6 Drawing Sheets

(56) References Cited

U.S. PATENT DOCUMENTS

| | | |
|---|---|---|
| 8,896,241 B2 | 11/2014 | Wernersbach et al. |
| 8,996,161 B2 | 3/2015 | Wernersbach et al. |
| 2007/0290638 A1 | 12/2007 | Faizullabhoy et al. |

\* cited by examiner

METHOD AND APPARATUS FOR INTERLEAVED SWITCHING OF TRACK SEGMENTS IN A MOTION CONTROL SYSTEM

BACKGROUND OF THE INVENTION

The present invention relates to motion control systems and, more specifically, to motion control systems incorporating multiple movers propelled along a track using a linear drive system.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

Due to the repetitive nature of the process, each mover will typically follow the same motion profile along the length of the track. In other words, each mover will accelerate or decelerate at the same location and similarly travel at a constant speed along the same segments of the track. As is understood in the art, changing the speed of the mover typically requires higher current than operating at a constant speed. Similarly, controlling motion of a loaded mover typically requires higher current than controlling motion of an empty mover. Thus, controlling the segments of track at which each mover is accelerating or decelerating will typically experience higher currents than segments of track at which each mover travels at a constant speed. Similarly, segments of track at which the mover is loaded, or experiencing an external force resulting from another actuator, may experience higher currents than, for example, a segment during which the mover is empty and having no action performed.

As previously indicated, coils are located along the track to generate a moving electromagnetic field by which each mover is propelled along the track. Because the change in speed occurs at the same location for each mover, the coils positioned along the track at that location are required to conduct a higher current and, therefore, generate an increased magnitude electromagnetic field to effect the change of speed on the mover. Further, to avoid abrupt changes in speed, the change in speed typically occurs over multiple coils spaced adjacent to each other at the location at which the change in speed occurs. In addition, each mover may span multiple coils and, therefore, the coils across which a mover is positioned will conduct the same magnitude of current. As a result of movers spanning multiple coils and utilizing multiple adjacent coils to create a change in speed of a mover, successive coils placed adjacent to each other typically have similar levels of elevated current.

The current flowing through the coils in a linear drive system may be regulated with a power converter that includes a processing unit and a series of switching devices, such as silicon controlled rectifiers (SCRs), thyristors, or transistors, such as power metal-oxide-semiconductor field-effect transistors (MOSFETs) or insulated-gate bipolar transistors (IGBTs). Multiple individually packaged switching devices may be positioned adjacent to each other or, optionally, a switching module may include multiple switching devices within a single housing to provide a reduced cost and more compact footprint for the switching devices. Each switching device is connected to one of the coils to supply power to the coil. The processing, unit generates control signals for each switching device to activate or deactivate the switching device and, in turn, the coil.

Typically, control of a linear drive system has been based largely on control methods employed in a rotational drive system. A rotational drive system sequentially activates coils in a stator to cause rotation of a rotor. A rotational drive system similarly includes switching devices connected to each winding on the stator. Further, a single power module often includes all of the switching devices to control the windings because activation in a rotational drive system is continually repeated around the stator. A linear drive system is similar to "unrolling" the rotational drive system. Stator windings are laid sequentially as the coils in the linear drive system and windings or permanent magnets are, mounted on the movers to serve as the rotor windings or permanent magnets that would be located in the rotor. Unlike a rotational drive system, however, multiple "stators" must be unrolled and placed along the length of travel of the linear drive system. The processor controls, operation of the mover along one "stator" section at a time, passing the rotor between unrolled stator sections.

In order to utilize control strategies employed for rotational drive systems, linear drive systems typically connect adjacent switching devices to adjacent coils along the linear drive system. If a switching module is utilized, each of the switching devices within one module are similarly connected to adjacent coils such that the switching devices control an equivalent to one stator section in a rotational drive system. As previously indicated, however, adjacent coils typically have similar current levels. Thus, at segments along the track that require an elevated current supplied to the coils, the adjacent switching devices or those devices within one switching module all supply that elevated current to the coils. The elevated current within the switching devices causes localized heating within the power converter for the linear drive system. Further, the localized heating of the switching devices may often be the limiting factor in the capacity of the linear drive system. Thus, additional heat removal techniques such as larger heat sinks and/or air or liquid cooling of the switching devices may be required.

Thus, it would be desirable to provide a power converter for a linear drive system having improved control of the switching devices to reduce the effects of localized heating within the power converter.

BRIEF DESCRIPTION OF THE INVENTION

The subject matter disclosed herein describes a power converter for a linear drive system having improved control of the switching devices to reduce the effects of localized heating within the power converter. The linear drive system controls multiple movers along a track. Multiple coils are positioned adjacent to each other along the length of the track. Each coil is connected to a switching device within the power converter to energize and de-energize the coils. In order to avoid localized heating within the power converter, pairs of adjacent switching devices are connected to coils that have at least one additional coil located between the adjacent switching devices. Thus, adjacent switching modules do not conduct the same level of current and those switching modules that are required to conduct elevated levels of current are spaced apart from each other within the power converter. Consequently, the heat generated as a result of the elevated current and increased switching is similarly spread out within the power converter.

In one embodiment of the invention, an apparatus for controlling motion of multiple movers along a track is disclosed. The apparatus includes multiple movers and multiple track segments. Each mover is independently controlled to move, along the track, and each mover includes multiple permanent magnets mounted to the mover. The permanent magnets are operative to propel the mover along the track responsive to an electromagnetic field. The multiple track segments define the track, and each track segment includes a DC bus, multiple coils, and at least one switching module. The DC bus has a first voltage rail and a second voltage rail, where each of the first voltage rail and the second voltage rail conduct a different voltage potential. The coils are distributed along a length of the track segment, and each coil generates at least a portion of the electromagnetic field propelling each mover along the track. The switching module includes multiple switching devices. Each switching device is operatively connected between either the first voltage rail or the second voltage rail and one of the plurality of coils to selectively connect the first voltage rail or the second voltage, rail to the corresponding coil. A first and second switching device are located next to each other within the switching module. The first switching device is connected to a first coil, and the second switching device is connected to a second coil. At least one additional coil is located along the length of the track segment between the first and second coils.

According to another embodiment of the invention, an apparatus for controlling activation of a plurality of coils, in a linear drive system is disclosed. The apparatus includes a DC bus, multiple output connections, multiple switching devices, and a controller. The DC bus has a first voltage rail and a second voltage rail, where each of the first voltage rail and the second voltage rail conduct a different voltage potential. Each output connection is connected to one of the coils, and each of the switching devices is operatively connected between either the first voltage rail or the second voltage rail and one of the output connections to selectively connect the first or second voltage rail to the corresponding output connection. The controller is operative to receive a command signal for at least one mover propelled by the linear drive system and to generate a plurality of switching signals. Each switching signal controls operation of one of the switching devices, and the switching signals are generated responsive to the command signal to propel the at least one mover according to the command signal. Each of the switching devices are positioned adjacent to each other, and each of the plurality of coils are positioned adjacent to each other along the linear drive system. At least one of the coils is located between a first coil and a second coil connected to adjacent switching devices.

According to still, another embodiment of the invention, a method for controlling activation of a plurality of coils in a linear drive system, is disclosed. A command signal corresponding to a desired motion for at least one mover propelled by the linear drive system is received, and multiple switching signals are generated as a function of the command signal. Each switching signal controls operation of a switching device, where each of the switching devices are positioned adjacent to each other, each of the plurality of coils are positioned adjacent to each other, and each switching device is operatively connected between either a first voltage rail or a second voltage rail and one of the coils. Each switching device is connected to one of the plurality of coils such that at least one coil is present between each of the coils to which adjacent switching devices are connected.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
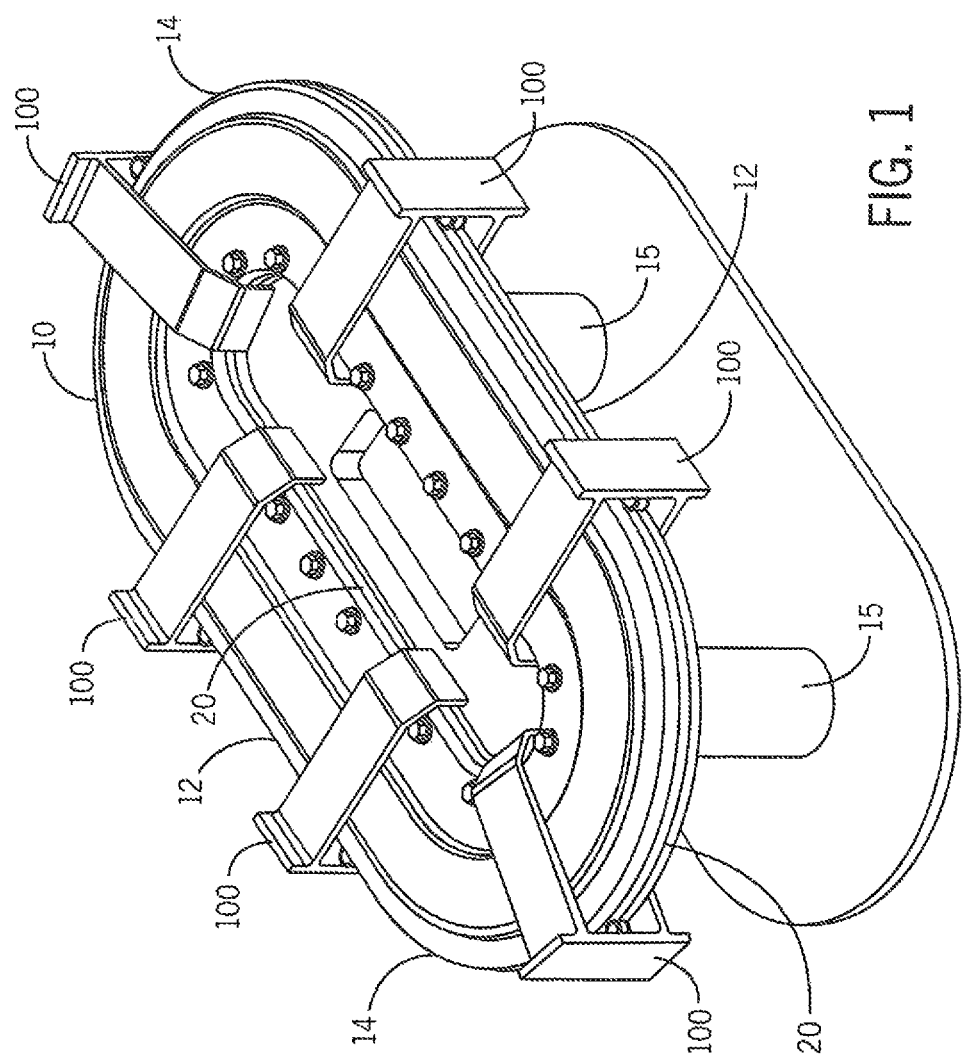
FIG. 1 is an exemplary transport system incorporating multiple movers travelling along a track and a motion control system for controlling segments in the track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection hut include

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a pair of legs 15 extending vertically downward from the track 10 on opposite sides of the track 10. The track 10 includes a pair of straight segments 12, where each straight segment 12 is spaced apart from the other and extends along one side of the track 10. The track 10 also includes a pair of curved segments 14 where each curved segment 14 is located at one end of the track 10 and connects the two straight segments 12. The two straight segments 12 and the two curved segments 14 firm a generally oval track and define a closed surface over which each of the movers 100 may travel. It is understood that track segments of various sizes, lengths, and shapes may be connected together to form a track 10 without deviating from the scope of the invention.

For convenience the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be, greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, a first rail 20 extends around the outer periphery of the track 10 and a second rail 20 extends around the inner periphery of the track 10. It is contemplated that the cross section of the rails 20 may be circular, square, rectangular, or any other desired cross-sectional shape without deviating from the scope of the invention. A complementary roller, or set of rollers, 120 (see also FIG. 3) is provided on each mover 100 to engage the rail 20 for movement along the track 10. The rails 20 generally conform to the curvature of the track 10 thus extending in a straight path along the straight track segments 12 and in a curved path, along the curved track segments 14. The rails 20 may be thin with respect to the width of the track 10 and span only a partial width of the side of the track 10 on which it is attached.

Figure 3:
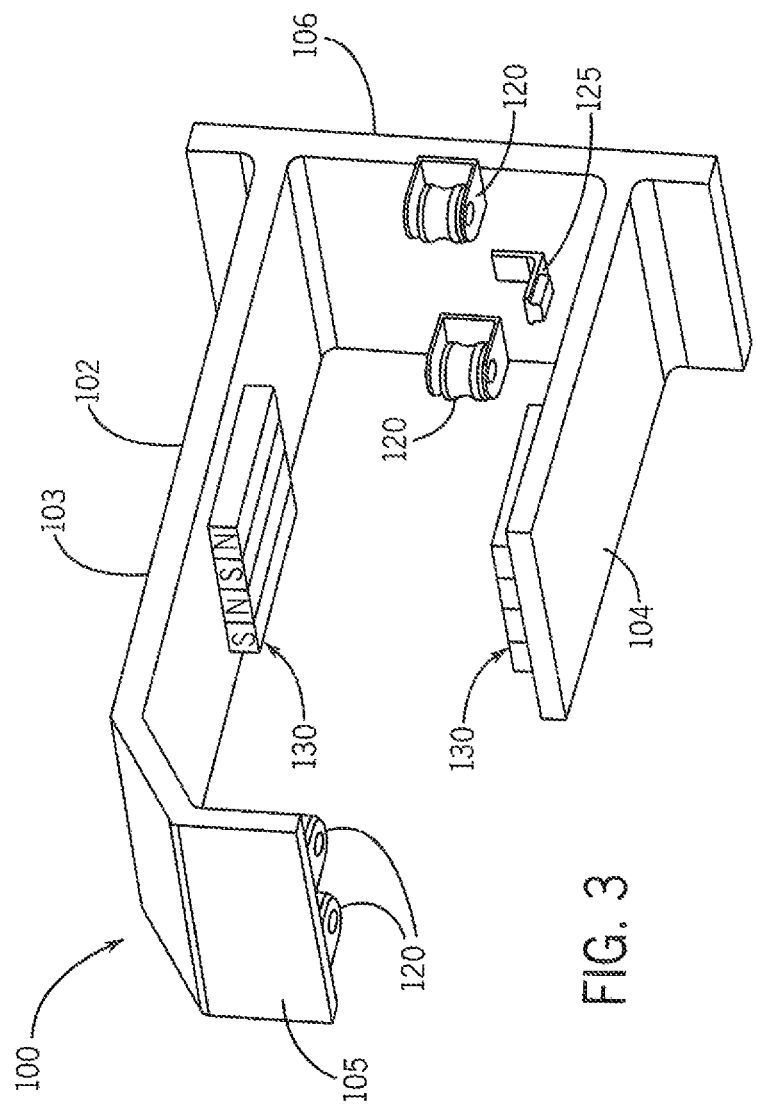
FIG. 3 is a partial isometric view of one of the movers of FIG. 1.

With reference next to FIGS. 1 and 3, one or more movers are mounted to and movable along the rails 20 on the track 10. An exemplary mover 100 will be discussed with respect to FIGS. 1 and 3. Each mover 100 includes a first mounting arm 102 extending across an upper surface of the track 10 and a second mounting arm 104 extending across at least a portion of a lower surface of the track 10. A side member 106 extends between the first and second mounting arms and extends across the outer edge of the track 10. The upper mounting arm 104 includes a first segment 103, extending orthogonally from the side member 106 for the width of the track 10, and a second segment 105, extending downward around the inner periphery of the track 10. The second segment 105 is generally parallel to the side member 106 and extends downward a sufficient distance that one or more rollers 120 may be mounted to the second segment 105 and engage the rail 20 along the inner periphery of the track 10. A second set of rollers 120 are mounted on the inner surface of the side member 106 and are operative to engage the rail 20 along the outer periphery of the track 10. Thus, the mover 100 rides along the rails 20 on the rollers 120 mounted to the second segment 105 of the first mounting arm 102 and to the inner surface of the side member 106.

Figure 2:
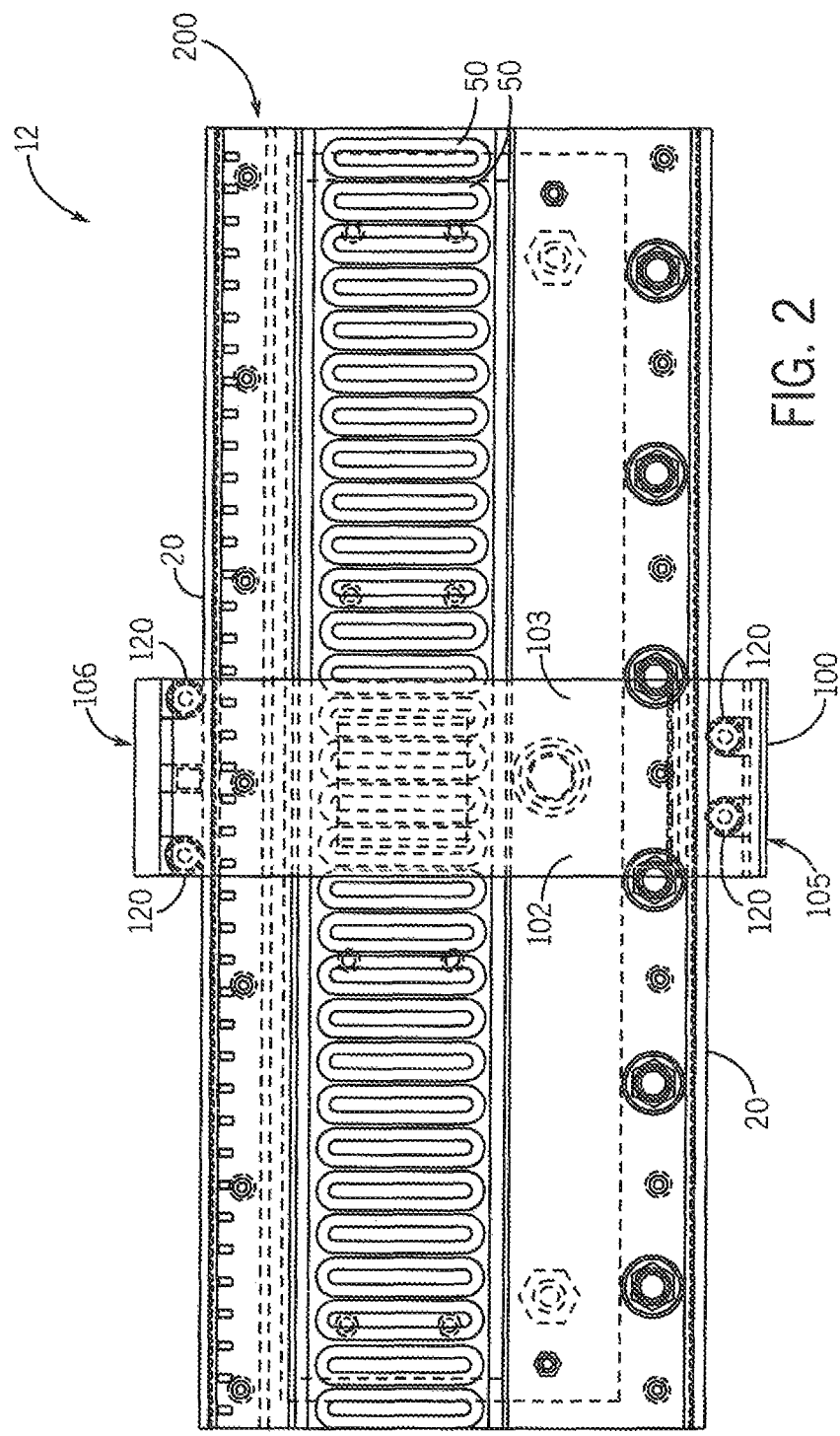
FIG. 2 is a partial top plan view of one segment of the transport system of FIG. 1 illustrating activation coils distributed along one surface of the track segment.

A linear drive system is incorporated within each track segment to control motion of each mover 100 along the segment. On each mover 100, the linear drive system includes multiple magnets 130. According to the illustrated embodiment, the magnets 130 are arranged in a block alternating between north, N, and south, S, poles. The magnets 130 are typically permanent magnets, and two adjacent magnets including a north pole and a south pole may be considered a pole-pair. According to the illustrated embodiment, a first set of magnets 130 is mounted on the inner surface of the first mounting arm 102, and a second set of magnets 130 is mounted on the inner surface of the second mounting arm 104, such that each set of magnets is proximate the track 10. Optionally, a single set of magnets 130 may be mounted to either the first or second mounting arms 102, 104. A small air gap is provided between each set of magnets 130 and the track 10. On the track 10, the linear drive system includes a series of parallel coils 50 spaced along each track segment 12 as shown in FIG. 2. According to the illustrated embodiment, each coil 50 is placed along one surface of the track segment 12. Optionally, the coil 50 may extend through the track segment 12 such that the coil establishes an electromagnetic field on both sides of the track segment 12. According to still another embodiment, pairs of coils 50 may be distributed along the track segment 12 where both coils 50 are controlled in tandem and each coil 50 in the pair is placed on an opposite side of the track segment 12. The electromagnetic field generated by each coil 50 spans the air gap and interacts with the magnets 130 mounted to the mover 100 to control operation of the mover 100.

A segment controller 200 is mounted within each track, segment 12. The segment controller 200 receives command signals from a system controller 30 (see also FIG. 4) and generates switching signals 230 for power segments 210 which, in turn, control activation of each coil 50. Activation of the coils 50 are controlled to drive and position each of the movers 100 along the track segment 12 according to the command signals received from the system controller 30.

Figure 4:
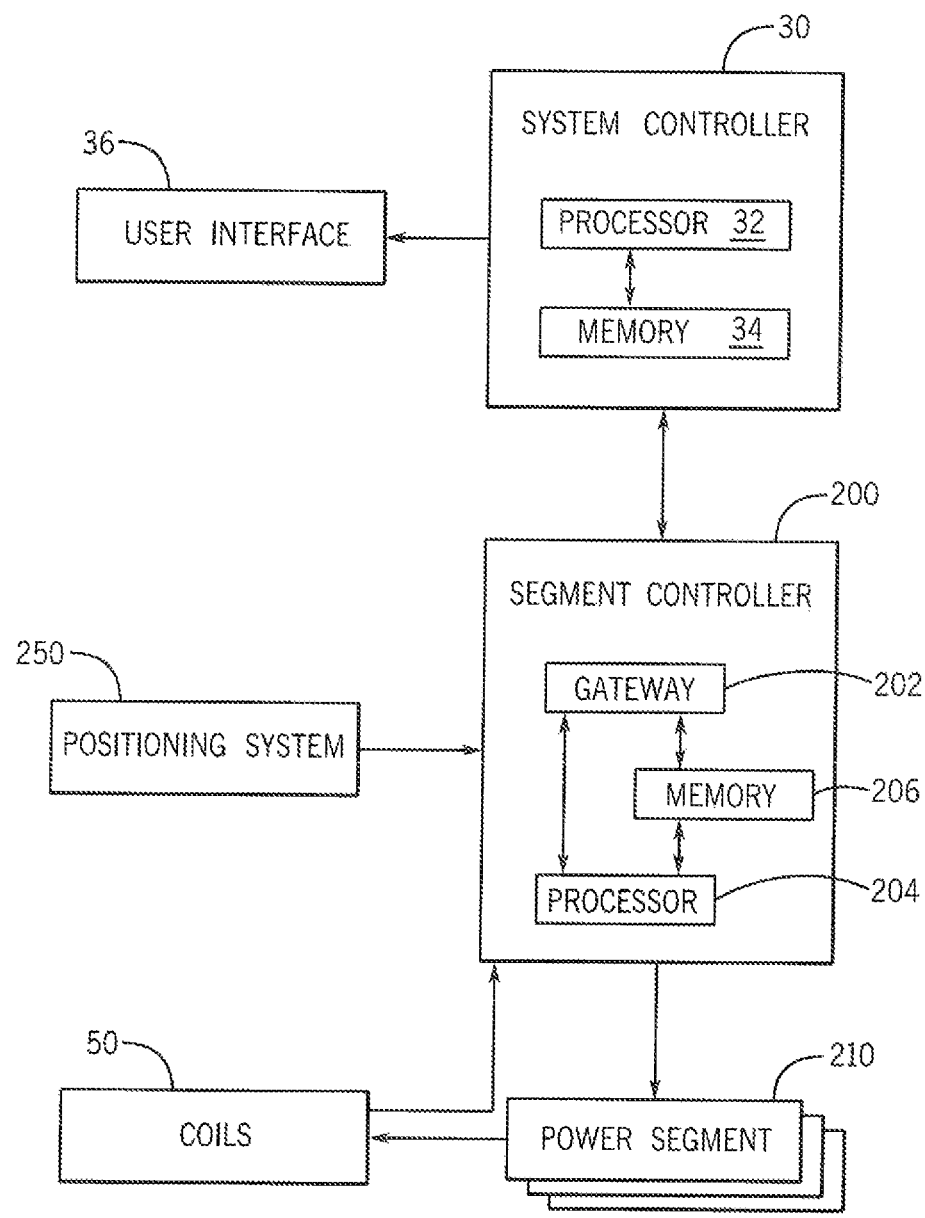
FIG. 4 is a block diagram representation of the motion control system of FIG. 1.

Referring next to FIG. 4, the illustrated motion control system includes a system controller 30 having a processor 32 and a memory device 34. It is contemplated that the processor 32 and memory device 34 may each be a single electronic device or formed from multiple devices. The processor may be 32 a microprocessor. Optionally, the processor 32 and/or the memory device 34 may be integrated on a field programmable array (FPGA) or an application specific integrated circuit (ASIC). The memory device 34 may include volatile, memory, non-volatile memory, or a combination thereof. A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touchscreen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow on the track 10. A program executing on the processor 32 is in communication with a segment controller 200 on each track segment 12, 14. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12, 14 that may be transmitted to the segment controller 200.

A gateway 202 in each segment controller 200 receives the communications from the system controller 30 and passes the communication to a processor 204 executing in the segment controller 200. The processor may be a microprocessor. Optionally, the processor 204 and/or a memory device 206 within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12, 14 controlled by that system controller 30.

Figure 5:
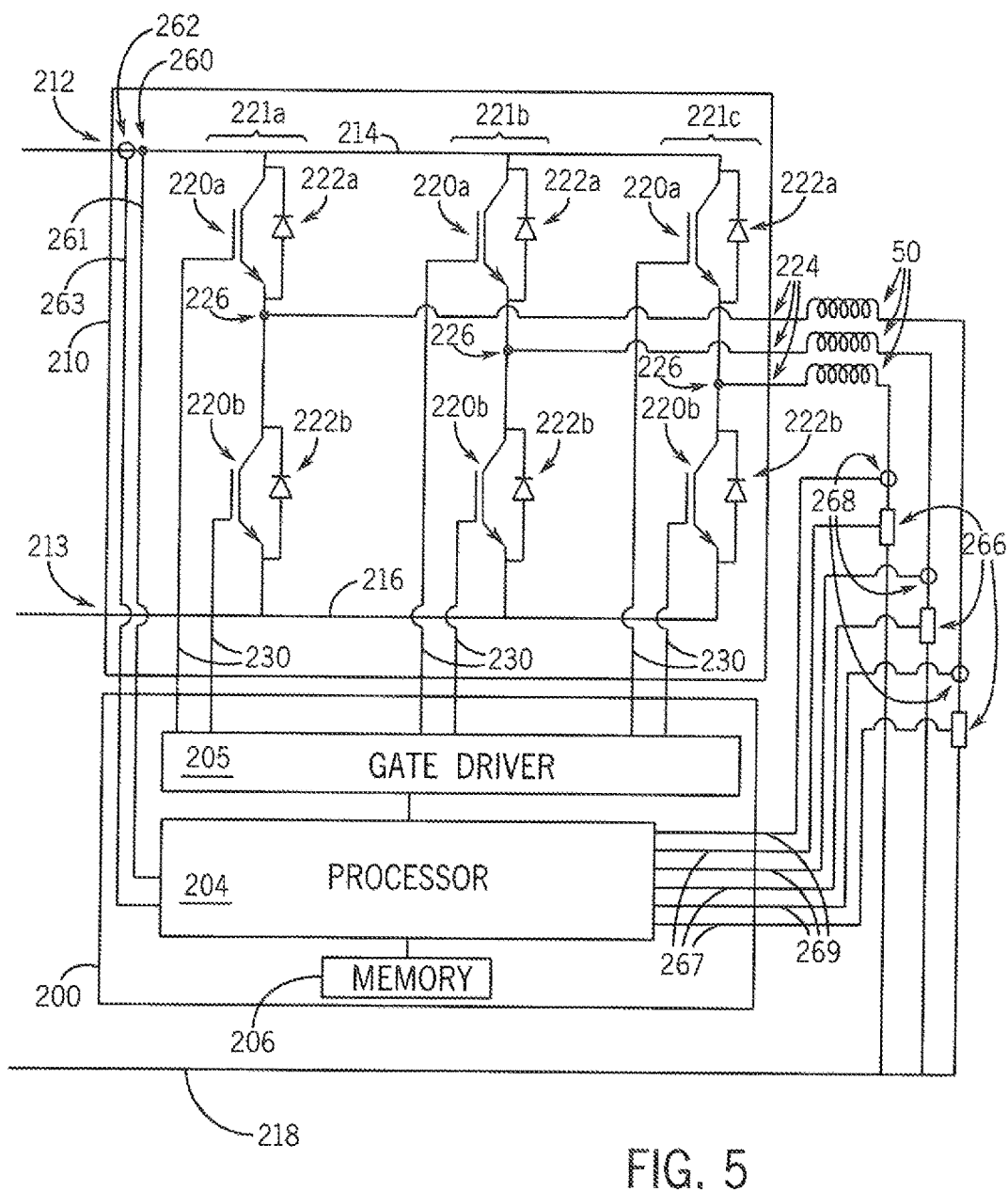
FIG. 5 is a schematic representation of a controller for one segment of the track as shown in FIG. 1.

Turning also to FIG. 5, each segment controller 200 generates switching signals 230 to control operation of switching devices 220 within each power segment 210. According to the illustrated embodiment, the segment controller 200 includes a dedicated gate driver module 205 which receives command signals from the processor 204, such as a desired voltage and/or current to be generated in each coil, and generates switching signals 230 to control operation of the switching devices 220 to achieve the desired operation. Optionally, the processor 204 may incorporate the gate driver module 205 functions and directly generate the switching signals 230.

The power segment 210 receives input power at a first input terminal 212 and a second input terminal 213. According to the illustrated embodiment, a DC voltage is provided at the input terminals 212, 213, supplying a first voltage potential to the first input terminal 212 and a second voltage potential to the second input terminal 213. The voltage potentials present at the first and second input terminals 21, 213 are conducted within the power segment 210 via a positive rail 214 and a negative rail 216. The terms positive and negative are used for reference herein and are not meant to be limiting. It is contemplated that the polarity of the DC voltage present between the input terminals 212, 213 may be negative, such that the potential on the negative rail 216 is greater than the potential on the positive rail 214. Each of the voltage rails 214, 216 are configured to conduct a DC voltage having a desired potential, according to application requirements. According to one embodiment of the invention, the positive rail 214 may have a DC voltage at a positive potential and the negative rail 216 may have a DC voltage at ground potential. Optionally, the positive rail 214 may have a DC voltage at ground potential and the negative rail 216 may have a DC voltage at a negative potential According to still another embodiment of the invention, the positive rail 214 may have a first DC voltage at a positive potential with respect to the ground potential and the negative rail 216 may have a second DC voltage at a negative potential with respect to the ground potential. The resulting DC voltage potential between the two rails 214, 216 is the difference between the potential present on the positive rail 214 and the negative rail 216.

It is further contemplated that the DC supply may include a third voltage rail 218 having a third voltage potential. According to one embodiment of the invention, the positive rail 214 has a positive voltage potential with respect to ground, the negative rail 216 has a negative voltage potential with respect to ground, and the third voltage rail 218 is maintained at a ground potential. Optionally, the negative voltage rail 216 may be at a ground potential, the positive voltage rail 214 may be at a first positive voltage potential with respect to ground, and the third voltage rail 218 may be at a second positive voltage potential with respect to ground, where the second positive voltage potential is approximately one half the magnitude of the first positive voltage potential. With such a split voltage DC bus, two of the switching devices 220 may be used in pairs to control operation of one coil 50 by alternately provide positive or negative voltages, at an output connection 224 to one the coils 50.

Each power segment 210 may include multiple legs 221, where each leg 221 is connected in parallel between the positive rail 214 and the negative rail 216. According to the illustrated embodiment, three legs 221a, 221b and 221c are shown. Each leg 221 includes a first switching device 220a and a second switching device 220b connected in series between the positive rail 214 and the negative rail 216 with a common connection 226 between the first and second switching devices 220a, 220b. The first switching device 220a in each leg 221 may also be referred to herein as an upper switch, and the second switching device 220b in each leg 221 may also be referred to herein as a lower switch. The terms upper and lower are relational only with respect to the schematic representation and are not intended to denote any particular physical relationship between the first and second switching devices 220a, 220b. The switching devices 220 include, for example, power semiconductor devices such as transistors, thyristors, and silicon controlled rectifiers, which receive switching signals 230 to turn on and/or off. Each of the first and second switching devices 220a, 220b includes a diode 222a, 222b connected in parallel between the common connection 226 and either the positive or negative rail 214, 216. According to one embodiment of the invention, it is contemplated that each of the switching devices 220a, 220b, and their corresponding diodes 222a, 222b illustrated in FIG. 5 may be included in a single switching module. Optionally, multiple switching modules may be operatively connected to a single segment controller 200 to control coils 50 located on the track segment 12, 14.

The processor 204 receives feedback signals from sensors providing an indication of the current operating conditions within the power segment 210 or the current operating conditions of a coil 50 connected to the power segment 210. According to the illustrated embodiment, the power segment 210 includes a voltage sensor 260 and a current sensor 262 at the input of the power segment 210. The voltage sensor 260 generates a voltage feedback signal 261 and the current sensor 262 generates a current feedback signal 263, where each feedback signal 261, 263 corresponds to the operating conditions on the positive rail 214. The segment controller 200 also receives feedback signals corresponding to the operation of coils 50 connected to the power segment 210. A voltage sensor 266 and a current sensor 268 are connected in series with the coils 50 at each output connection 224. The voltage sensor 266 generates a voltage feedback signal 267 and the current sensor 268 generates a current feedback signal 269, where each feedback signal 267, 269 corresponds to the operating condition of the corresponding coil 50. The processor 204 executes a program stored on the memory device 206 to generate switching signals 230 which selectively enable/disable each of the switching devices 220.

Sensors or sensor arrays 125 may also be installed on the inner surface of the side member 106, as illustrated, or on the inner surface of the upper mounting arm 102 or lower mounting arm 104 and interact with elements of the track or additional position sensing components mounted to the track. The sensors 125 may be part of the positioning system 250 of each mover and generate a signal corresponding to the position of the mover 100 along the track segment 12, 14. For instance, the sensors 125 may be hall-effect sensors which generate a signal as each mover passes a magnet or series of magnets mounted to the track segment. The signals are transmitted to the processor 204 to determine the location of the mover 100 along the track segment 12, 14. Optionally, other position feedback devices may be utilized such as encoders, resolvers, and the like generate a position feedback signal for each mover 100. The feedback signals that can be used to derive velocity, acceleration, jerk and other motion parameters of each mover 100. The segment controller 200 may use the position feedback signal in combination with the feedback signals from the voltage and current sensors to generate the switching signals to control operation of the coils 50 on each track segment 12, 14.

Figure 6:
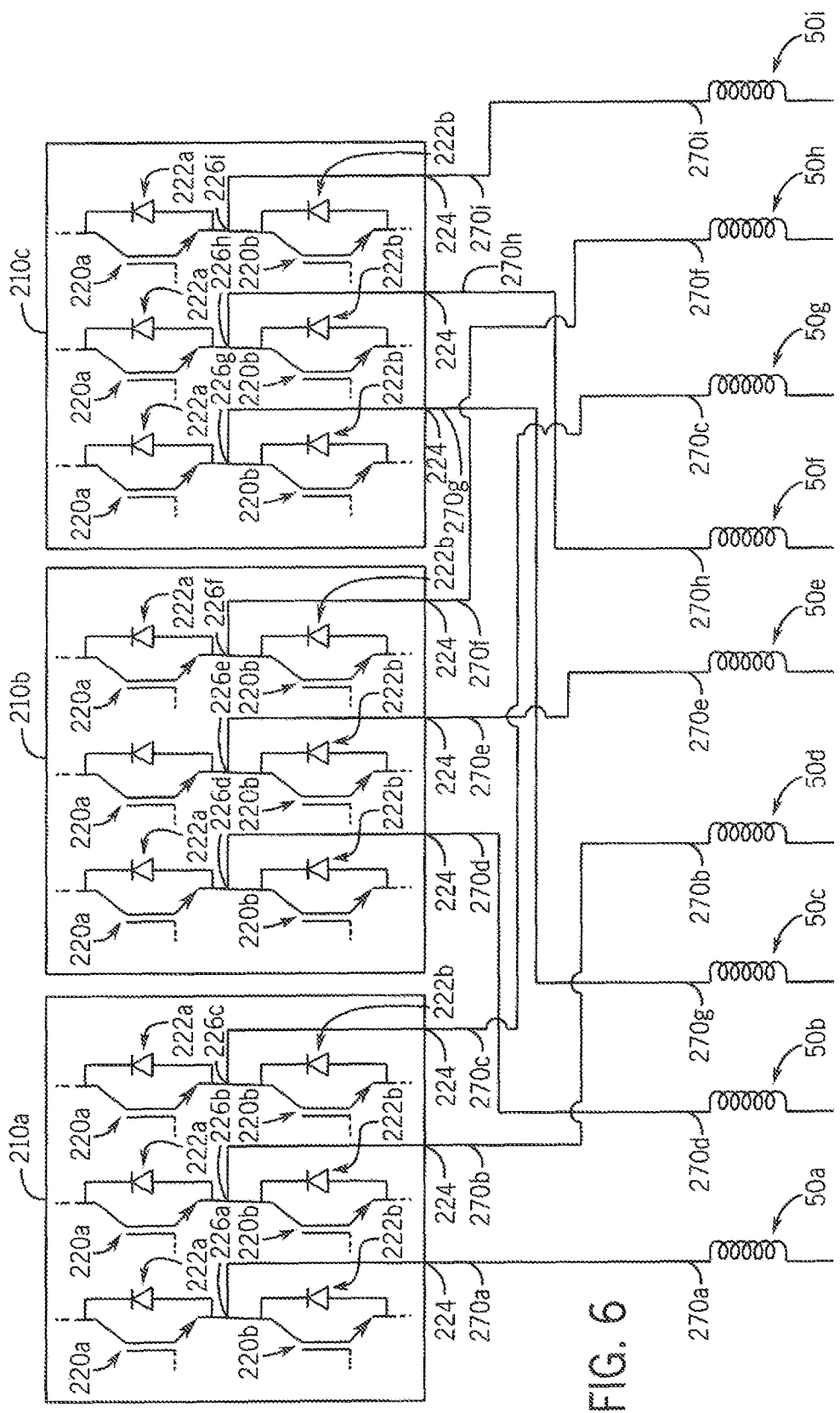
FIG. 6 is a schematic representation of an interconnection between the activation coils and the switching modules along one track segment according to one embodiment of the invention.

Turning next to FIG. 6, the switching devices 220 are connected to the coils 50 along a track segment in a manner to deliver power to the coils 50. According to the illustrated embodiment, one track segment includes nine coils 50a-50i and three power segments 210. It is contemplated that each power segment 210 includes a switching module containing six switching devices 220 and six reverse conduction diodes 222. According to one embodiment of the invention, the power segment 210 is an IGBT brick with each of the switching devices 220 and diodes 222 integrally formed within a single housing. Pairs of the switching devices 220 are connected to a common connection 226 where the upper switching device 220a is connected between the positive rail 214 and the common connection 226 and the lower switching device 220b is connected between the negative rail 216 and the common connection 226. Switching signals 230 are provided to each pair of upper and lower switching devices such that one device conducts at a time to control the voltage provided to one coil 50 alone the track segment. Electrical conductors 270 are provided between each common connection 226 and one of the coils 50 to provide the current to each coil 50 and, thereby, generate the electromagnetic field from the coil 50 to control motion of the mover 100.

As also illustrated in FIG. 6, the switching devices 220 are connected to the coils 50 along a track segment in a manner to reduce localized heating within the power segment 210. Each power segment 210 controls operation of three coils 50. Thus, three power segments 210a-210c control operation of nine coils 50a-50i. In a first power segment 210a, a first common connection 226a between a first pair of switching devices is connected via a first conductor 270a to a first coil 50a; a second common connection 226b between a second pair of, switching devices is connected via a second conductor 270b to a fourth coil 50d; and a third common connection 226c between a third pair of switching devices is connected via a third conductor 270c to a seventh coil 50g. In a second power segment 210b, a fourth common connection 226d between a fourth pair of switching devices, is connected via a fourth conductor 270d to a second coil 50b; a fifth common connection 226e between a fifth pair of switching devices is connected via a fifth conductor 270e to a fifth coil 50e; and a sixth common connection 226f between a sixth pair of switching devices is connected via a sixth conductor 270f to an eighth coil 50h. In a third power segment 210c, a seventh common connection 226g between a seventh pair of switching devices is connected via a seventh conductor 270g to a third coil 50c; an eighth common connection 226h between an eighth pair of switching devices is connected via an eighth conductor 270h to a sixth coil 50f; and a ninth common connection 226i between a ninth pair of switching devices is connected via a ninth conductor 270i to a ninth coil 50i. In this manner, the outputs of each switching module are interleaved with each other such that each pair of switching devices that are located adjacent to each other is connected to a coil 50 with at least one additional coil 50 located between the respective coils.

In operation, the segment controller 200 controls activation of the coils 50 to achieve a desired motion of one or more movers 100 along the track segment 12, 14 on which the segment controller 200 is mounted. The segment controller 200 receives a command signal from the system controller 30 corresponding to the desired motion of a mover 100 along the track segment on which the segment controller is mounted. The command signal may be any suitable command, including, but not limited to a motion profile, a partial motion profile, a switching sequence, a speed profile, an acceleration profile, and the like. The segment controller 200 activates each switching device 220 such that the coils 50 are energized sequentially and, thereby, causing the movers 100 to travel along the track segment according to the command signal.

Because the coils 50 are connected in an interleaved manner to the switching modules, adjacent coils, which, as discussed above, typically require currents of similar magnitude are controlled by switching devices 220 that are spaced apart from each other. According to an exemplary embodiment, a desired change in speed of a mover 100 traveling along the track segment may require a span of three coils to accelerate a mover 100 from a first speed to a second speed. For discussion, it will be assumed that the acceleration occurs over the span of a track segment populated by the first three coils 50*a*-50*c* as illustrated in FIG. 6. The mover 100 then travels at, a constant speed over the remaining length of the track segment and across the remaining coils 50*d*-50*i*. As a result, a higher current magnitude is conducted in the first three coils 50*a*-50*c* than the remaining coils. In a traditional connection, each, of the first three coils 50*a*-50*c* would be connected to the first power segment 210*a*. In the illustrated embodiment, the first coil 50*a* is connected to the first power segment 210*a*, the second coil 50*b* is connected to the second power segment 210*b* and the third coil 50*c* is connected to the third power segment 210*c*. As a result, the higher current required by each of the first three coils 50*a*-50*c* is conducted through a different power segment 210. The heat generated by each switching device 220 or pair of switching devices 220*a*, 220*b* regulating the current through a coil 50 is distributed across three power segments 210*a*-210*c* rather than being concentrated in a single power segment 210. The resultant temperature rise in a single power segment 210 is reduced compared to the traditional connection.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for controlling motion of multiple movers along a track, the apparatus comprising:
   a plurality of movers, wherein each mover is independently controlled to move along the track and wherein each mover includes a plurality of permanent magnets mounted to the mover and operative to propel the mover along the track responsive to an electromagnetic field;
   a plurality of track segments, wherein the plurality of track segments define the track and wherein each track segment includes:
      a DC bus having a first voltage rail and a second voltage rail, wherein each of the first voltage rail and the second voltage rail conduct a different voltage potential;
      a plurality of coils distributed along a length of the track segment, wherein each coil generates at least a portion of the electromagnetic field and wherein the plurality of coils are energized sequentially to propel each of the plurality of movers along the track; and
      at least one switching module including a plurality of switching devices, wherein each switching device is operatively connected between one of the first voltage rail and the second voltage rail and one of the plurality of coils to selectively connect one of the first voltage rail and the second voltage rail to the corresponding coil, wherein:
         a first switching device and a second switching device, each selected from the plurality of switching devices, are located next to each other within the switching module,
         the first switching device is connected to a first coil, selected from the plurality of coils,
         the second switching device is connected to a second coil, selected from the plurality of coils, and
         at least one additional coil is located along the length of the track segment between the first and second coils.

2. The apparatus of claim 1 wherein each of the plurality of switching devices is located next to at least one other of the plurality of switching devices within the switching module and wherein at least one coil, selected from the plurality of coils is located between the coils connected to each of the switching devices located next to each other.

3. The apparatus of claim 1 wherein each switching module controls operation of a predefined number of coils and wherein each of the coils controlled by the switching module are spaced apart by the predefined number.

4. The apparatus of claim 1 wherein:
   the DC bus includes a third voltage rail,
   each of the plurality of coils includes a first connection and a second connection,
   each of the plurality of coils is connected to the corresponding switching device at the first connection, and
   the second connection of each of the plurality of coils is connected to the third voltage rail of the DC bus.

5. The apparatus of claim 4 wherein:
   the first switching device is connected between the first voltage rail and the first coil;
   a third switching device, selected from the plurality of switching devices, is connected between the second voltage rail and the first coil; and
   the second switching device is connected between the first voltage rail and the second coil;
   a fourth switching device, selected from the plurality of switching devices, is connected between the second voltage rail and the second coil;
   the first and third switching devices are coordinated to control operation of the first coil; and
   the second and fourth switching devices are coordinated to control operation of the second coil.

6. The apparatus of claim 1 wherein each track segment further includes:
   a memory operative to store a plurality of instructions; and
   a segment controller operatively connected to the memory to execute the plurality of instructions, wherein the plurality of instructions are operative to:
      generate a switching signal for each of the switching devices to selectively enable each of the plurality of coils, and
      sequentially control generation of the switching signal to propel each mover along the track.

7. The apparatus of claim 6 further comprising a system controller operative to generate a motion profile for each of the plurality of track segments and to transmit the motion profile to the corresponding track segment, wherein the segment controller on each track segment is operative to receive the motion profile and to generate the switching signals responsive to the motion profile.

8. An apparatus for controlling activation of a plurality of coils in a linear drive system, the apparatus comprising:
   a DC bus having a first voltage rail and a second voltage rail, wherein each of the first voltage rail and the second voltage rail conduct a different voltage potential;
   a plurality of output connections, wherein each output connection is connected to one of the plurality of coils;
   a plurality of switching devices operatively connected between one of the first voltage rail and the second voltage rail and one of the plurality of output connections to selectively connect one of the first voltage rail and the second voltage rail to the corresponding output connection; and a controller operative to receive a command signal for at least one mover propelled by the linear drive system and to generate a plurality of switching signals, wherein:
- each switching signal controls operation of one of the plurality of switching devices,
- the switching signals are generated responsive to the command signal to sequentially control operation of the corresponding switching device and to propel the at least one mover according to the command signal,
- each of the switching devices are positioned adjacent to each other,
- each of the plurality of coils are positioned adjacent to each other along the linear drive system, and
- at least one of the plurality of coils is located between a first coil and a second coil connected to adjacent switching devices.

9. The apparatus of claim 8 further comprising a plurality of switching modules wherein each switching module includes at least two of the plurality of switching devices.

10. The apparatus of claim 9 wherein each switching module controls operation of a predefined number of coils and wherein each of the coils controlled by the switching module are spaced apart by the predefined number.

11. The apparatus of claim 8 wherein:
the DC bus includes a third voltage rail,
each of the plurality of coils includes a first connection and a second connection,
each of the plurality of coils is connected to the corresponding output connection at the first connection, and
the second connection of each of the plurality of coils is connected to the third voltage rail of the DC bus.

12. The apparatus of claim 11 wherein:
a first switching device, selected from the plurality of switching devices, is connected between the first voltage rail and a first output connection, selected from the plurality of output connections;
a second switching device, selected from the plurality of switching devices, is connected between the second voltage rail and the first output connection; and
the controller generates and coordinates switching signals for the first and second switching devices to control operation of one coil connected the first output connection.

13. A method for controlling activation of a plurality of coils in a linear drive system, comprising the steps of:
receiving a command signal corresponding to a desired motion for at least one mover propelled by the linear drive system; and
generating a plurality of switching signals as a function of the command signal, wherein:
- each switching signal controls operation of a switching device,
- each of the switching devices are positioned adjacent to each other,
- each of the plurality of coils are positioned adjacent to each other,
- each switching device is operatively connected between one of a first voltage rail and a second voltage rail and one of the plurality of coils,
- each of the switching devices is connected to one of the plurality of coils such that at least one coil is present between each of the coils to which adjacent switching devices are connected, and
- the plurality of switching signals energize switching devices such that coils positioned adjacent to each other are sequentially energized to propel the at least one mover along the linear drive system.

14. The method of claim 13 wherein the linear drive system extends along a track including a plurality of track segments and wherein each track segment includes a segment controller operative to receive the command signal corresponding to the desired motion for the at least one mover propelled by the linear drive system along the track segment, the method further comprising the steps of:
generating the command signal for each of the plurality of track segments in a system controller responsive to a desired motion profile for the at least one mover along the linear drive system; and
transmitting the command signals from the system controller to the segment controller in each of the plurality of track segments.

15. The method of claim 14 wherein:
each track segment includes a plurality of switching modules,
each switching module includes a plurality of switching devices to control a predefined number of coils, and
each pair of coils connected to adjacent switching devices are spaced apart by the predefined number of coils.

* * * * *